United States Patent [19]

Iwata

[11] 4,349,820

[45] Sep. 14, 1982

[54] TONE SIGNAL DECODER

[75] Inventor: Keisuke Iwata, Tokyo, Japan

[73] Assignee: Iwata Electric Co., Ltd., Tokyo, Japan

[21] Appl. No.: 180,938

[22] Filed: Aug. 25, 1980

[30] Foreign Application Priority Data

Aug. 25, 1979 [JP] Japan ............................... 54-108396

[51] Int. Cl.[3] ........................ H04Q 1/44; G08B 13/22

[52] U.S. Cl. ................................ 340/825.71; 340/539

[58] Field of Search ................... 340/171 R, 538, 539, 340/167 A, 694

[56] References Cited

U.S. PATENT DOCUMENTS

| | | | |
|---|---|---|---|
| 3,671,939 | 6/1972 | Trimble | 340/171 |
| 4,134,108 | 1/1979 | Palmer et al. | 340/167 A |
| 4,148,020 | 4/1979 | Siemer et al. | 340/538 |

*Primary Examiner*—Donald J. Yusko

*Attorney, Agent, or Firm*—Robert E. Burns; Emmanuel J. Lobato; Bruce L. Adams

[57] ABSTRACT

A tone signal decoder in a remote control device which uses one tone signal to feed information. The tone signal decoder comprises a charge and discharge circuit having a capacitor to control the latter by application of said tone signal thereto, a bypass circuit for charging or discharging said capacitor, when said tone signal is not applied, within the time shorter than the charge or discharge time by said charge and discharge circuit, and a threshold circuit actuated when said capacitor reaches a threshold level. Immediately when said tone signal is interrupted by said bypass circuit, said capacitor is brought into an initial set state to prevent malfunction with respect to the other tone signal fed by the same carrier.

5 Claims, 7 Drawing Figures

TONE SIGNAL DECODER

FIELD OF THE INVENTION

The present invention relates to a receiver for a remote control device utilizing a civilian band, and more specifically, to a tone signal decoder which does not malfunction in response to a tone signal of other devices transmitted on the same carrier wave.

Remote control devices which utilize a civilian band include a radio paging service which gives an indication to a particular individual, who is away from his usual location or who is traveling from place to place, by producing a radio wave or an audible signal. There has been proposed an automobile theft alarm device which utilizes said radio paging service in which a transmitter is provided in the automobile so that when the automobile's door is opened, the transmitter is actuated by operation of the door switch to transmit a tone modulated wave, which is in turn received by a radio receiver carried by the driver to sound an alarm.

Such radio paging service and automobile theft alarm device being widely used, it is necessary to effectively utilize the assigned frequency band of the civilian band. There are two systems for transmitting a tone signal, one for a one tone transmitting system which transmits a signal at a predetermined feed time within a predetermined carrier, and the other for a two tone sequential transmitting system which can transmit, continuously and repeatedly for plural times, two tone signals of different frequency within a predetermined carrier.

DESCRIPTION OF THE PRIOR ART

Apparatus for receiving a tone signal transmitted in the one tone transmitting system is disclosed, for example, in U.S. Pat. No. 3,617,888 invented by George M. Hanus et al. In this receiver, a tone signal received in a receiving circuit from an antenna is detected by a detector and then amplified by an amplifier, after which only the desired tone signal is removed by a lead filter, said tone signal being applied to the decoder. The decoder has a charge and discharge circuit utilizing a time constant selected so that when the tone signal is applied, the charge and discharge circuit is charged by which an audible signal is put out from a speaker. The receiver device of the one tone transmitting system is simple in construction because only the desired tone signal is removed positively and the feed time for said signal may merely be detected accurately.

On the other hand, the tone signal receiving apparatus is the two tone sequential transmitting system is disclosed, for example, in U.S. Pat. No. 3,686,635 invented by Raymond J. Millington et al. This receiver device is fundamentally similar to the above described one tone transmitting system but suffers from disadvantages in that the device is complicated in construction and hard to miniaturize as compared to that of the one tone transmitting system because two filters must be provided in order to separate two tone signals and apply them into the decoder, and timing of two tone signals must be processed correctly in the decoder. However, the two tone sequential transmitting system uses a combination of two different tone signals, and therefore, it is possible to prepare a number of combined signals. Thus, this system is excellent in that the limited civilian band can be utilized effectively. For this reason, the two tone sequential transmitting system is widely used lately.

With the result that the civilian band is effectively utilized with the emergence of the two transmitting systems as described above, where for example, within the same carrier as that used in the one tone transmitting system, first and second tone signals in the two tone sequential transmitting system are repeatedly transmitted and the first or second tone signal is different from the tone signal in the one tone transmitting system only in feed time thereof, the receiver in the one tone transmitting system possibly malfunctions in response to the two sequential tone signal. That is, in the receiver of the two tone sequential transmitting system, only the first or second tone signal is applied to the decoder by means of a filter. However, in this case, the signal is intermittently applied and thus, the receiver likely malfunctions by responding as if a correct tone signal is applied.

SUMMARY OF THE INVENTION

It is an object of the present invention to provide a decoder for a receiver device in a remote control device using one tone signal, which device is very simple in circuit construction to avoid malfunction with respect to the other tone transmitting system.

It is a further object of the present invention to provide a one tone signal decoder which can assure whether or not a power source voltage is at a predetermined level when the power is turned on.

In accordance with the present invention, there is provided a tone signal decoder responsive to a predetermined tone signal, comprising a power source, an input terminal to which a tone signal is applied, a charge and discharge circuit connected to said input terminal, said circuit having a capacitor, said capacitor being controlled in charge and discharge thereof by application of said tone signal thereto, a bypass circuit connected to said charge and discharge circuit so that when said tone signal is not applied, said capacitor is placed in one state out of the charge and discharge states within a time shorter than that required by said charge and discharge circuit, and a threshold circuit actuated when the terminal voltage reaches a threshold level because of said one state of said capacitor.

In a preferred embodiment of the present invention, when the predetermined tone signal is applied to the input terminal, the capacitor having been charged by the power source voltage starts discharging, and when the terminal voltage of the capacitor reaches a predetermined value by said discharge of the capacitor, a transistor for detecting a threshold level is turned on, and develops an output signal. During the time when the tone signal is applied to the input terminal, the capacitor keeps discharging. When the tone signal terminates, the capacitor is immediately charged by the power source voltage, but at this time, the capacitor is rapidly charged by two transistors which constitute an inverting amplifier in the bypass circuit. Accordingly, even if the tone signal is intermittently applied to the decoder, and even if a signal shorter than the predetermined tone signal or noise signal is received, the capacitor is rapidly charged during the quiescent time between the signals and thus the terminal voltage of the capacitor is decreased to thereby prevent unintentional actuation of an alarming oscillator so as to prevent an alarm resulting from an erroneous signal.

The tone signal decoder in accordance with the present invention is provided with a switch for directly applying a power source voltage to the capacitor, by which switch, the threshold circuit actuated by turning on the power source is forcibly turned off. With this arrangement, where the power source voltage is at a predetermined level when the power source is turned on, the power source may be assured if the threshold circuit is set to be actuated, and the decoder may be reset by actuation of said switch.

DESCRIPTION OF THE PREFERRED EMBODIMENTS

Figure 1:
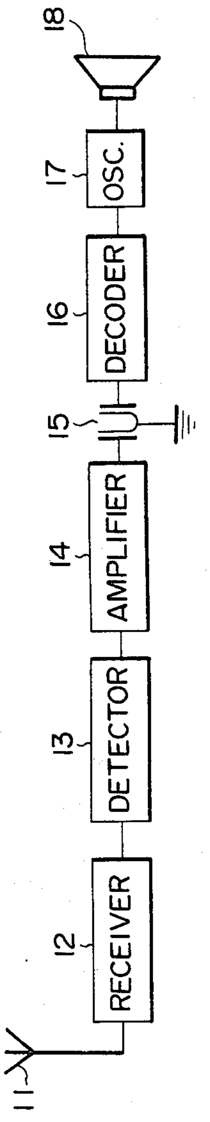
FIG. 1 is a block diagram of a receiver device having a tone signal decoder in accordance with the present invention.

Turning now to the drawings, FIG. 1 is a block diagram showing the entire receiver device including a decoder in accordance with the present invention. A code-modulated one tone code signal from a transmitter device (not shown) is applied to a receiving circuit from an antenna 11. An output of the receiving circuit 12 is demodulated by a detector 13 and amplified by an amplifier 14. An output of the amplifier 14 is applied to a mechanical filter 15 such as a sound filter, and only the desired tone signal is passed through and applied to a decoder 16 in the succeeding stage. The decoder 16 detects only the signal which is maintained for a period of time more than a predetermined time, and an oscillator 17 is actuated by said signal to provide an oscillating sound signal which is applied to a speaker 18, from which an alarm sound is produced. Various circuits and devices except the decoder 16 are well known for example from the abovementioned U.S. Pat. No. 3,617,888 and the operation thereof is also well known. Therefore, detailed description therefor is not further made.

Figure 2:
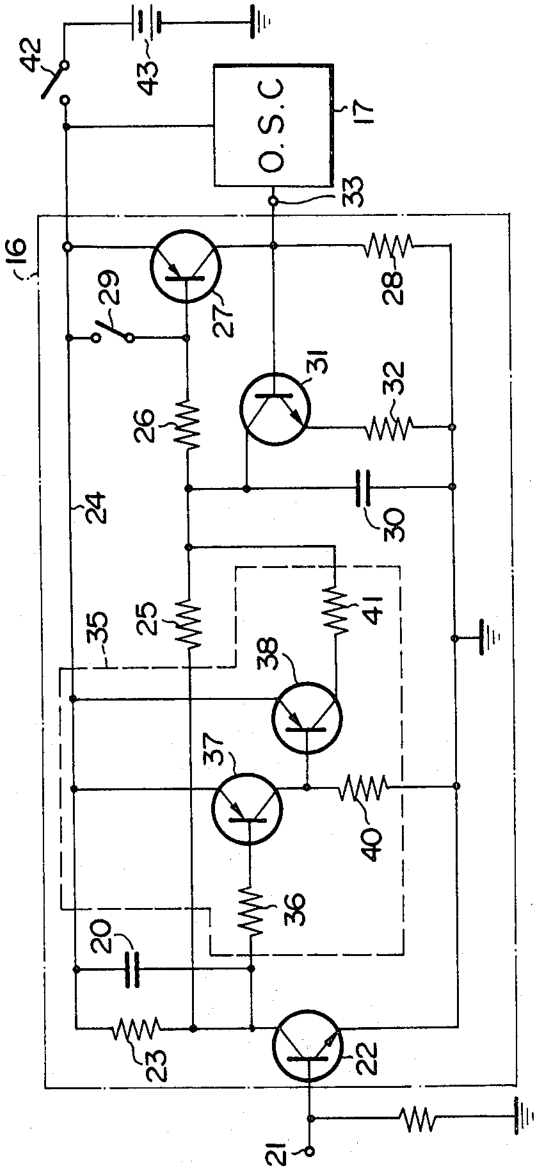
FIG. 2 is a circuit diagram showing a preferred embodiment of the decoder in accordance with the present invention.

FIG. 2 is a circuit diagram showing one embodiment of the decoder in accordance with the present invention, the entire decoder being encircled by phantom lines and designated 16 similarly as in FIG. 1. An input terminal 21 of the decoder 16 is connected to an output terminal of the filter 15 in FIG. 1. Connected to the input terminal 21 is a base of a tone signal detecting transistor 22 whose emitter is grounded. A collector of the transistor 22 is connected to a lead wire 24 through a resistor 23 and a smoothing capacitor 20 connected parallel to the resistor 23. The collector of the transistor 22 is also connected to the base of a threshold detecting transistor 27 through two series-connected resistors 25 and 26. The transistor 27 has an emitter connected to the lead wire 24 and a collector grounded through a resistor 28. Between the base and emitter of the transistor 27 is connected a normally open reset switch 29 which resets the transistor 27 to its off state. A capacitor 30 and a collector of the transistor 31 are connected between the resistors 25 and 26. The capacitor 30 has the other end grounded, the transistor 31 has the base connected to the collector of the transistor 27, and the transistor 31 has its emitter grounded through a resistor 32. A collector of the transistor 27 and a base of the transistor 32 are both connected to an output terminal 33, which is in turn connected to an input side of the oscillator 17 of FIG. 1. That is, the transistors 27 and 31 are connected so as to form a hold circuit.

The decoder 20 has a bypass circuit 35 which is operated as a malfunction preventive circuit encircled by the dotted line in FIG. 2. The bypass circuit 35 comprises a transistor 37 whose base is connected to the collector of the transistor 22 through a resistor 36 and a transistor 38 whose base is connected to the collector of the transistor 37. These transistors 37 and 38 constitute an inverting amplifier. The transistor 37 has an emitter connected to the lead wire 24, a collector thereof being grounded through a resistor 40. The transistor 38 has an emitter connected to the lead wire 24, a collector thereof being connected between resistors 25 and 26 through a resistor 41.

The lead wire 24 is connected to a power source battery 43 through a power source switch 42. It is clear that the aforesaid switch can be used as a power source switch for all circuits shown in FIG. 1.

Next, the operation of the tone signal decoder will be described. First, when the power source switch 42 is turned on, it is possible to assure whether or not the power source battery 43 has a predetermined voltage. That is, when the power source switch 42 is turned on, the capacitor 30 is charged through the resistors 23 and 25. Until the capacitor 30 has been charged, the base of the transistor 27 remains at a low potential and the transistor is turned on. Accordingly, the transistor 31 is also turned on, and a voltage for actuating the oscillator 17 is applied to the output terminal 33 to sound an alarm from the speaker 18. This can assure the voltage of the power source battery 43. The alarm sound can be stopped by positioning the reset switch 29 to its on state. When the switch 29 is turned on, the power source voltage is applied to the base of the transistor 27 through the switch 29 to forcibly turn off the transistor 27. Since the capacitor 30 is charged to a power source voltage Vcc simultaneously with turn-off of the transistor 27, the switch 29 is momentarily actuated to turn off the transistor 27, whereby the oscillator 17 is stopped from operating.

Figure 3:
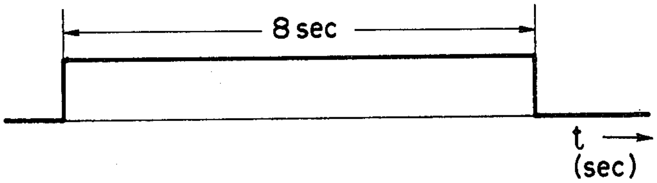
FIG. 3 shows a waveform of one tone signal used in the present invention.

Next, the operation of the decoder 16 will be explained when the tone signal is received from the filter 15. First, a description of the device operation will be given except for the bypass circuit 35. It is assumed in the present embodiment that as shown in FIG. 3, when one tone signal having a duration or feed time of 8 seconds arrives, the oscillator is actuated. As described above, the capacitor 30 is charged when the power source switch 42 is turned on and the reset switch 29 is turned on. In this condition, when the signal shown in FIG. 3 from the filter 15 shown in FIG. 1 is applied to the base of the transistor 22 from the input terminal 21, the transistor 22 is turned on. When the transistor 22 is turned on, the capacitor 30 begins to be discharged through the resistor 25 and transistor 22. When the terminal voltage of the capacitor 30 is decreased by said discharge, for example, from 3 V to 27 V, the transistor 27 is turned on, whereby the transistor 31 is also turned on. The turn-on operation of the transistor 31 is to hold the on-state of the transistor 27. The time required until the transistor 27 is turned on is about 3 seconds if the resistance of resistor 27 is 390 KΩ and the capacitance of capacitor 30 is 22 μF. As a result, the discharge of the capacitor 30 is effected through the transistor 31 and resistor 32. When the transistor 27 is turned on, the discharge of the capacitor 30 is effected through the transistor 31 and resistor 32. The time required for the discharge is about 3 seconds when the receiving state is good, namely, the S/N ratio is good and 5–6 seconds, which is longer than the former, when the power source voltage is low and the S/N ratio is poor. On the other hand, when the transistor is turned on, a signal is provided in the output terminal, and the oscillator 17 is actuated by said signal.

Figure 4:
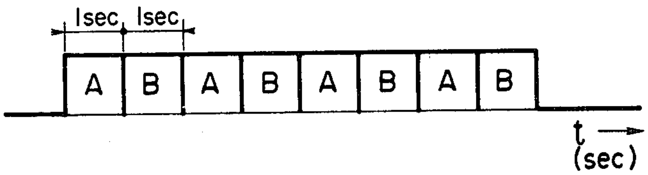
FIG. 4 shows a waveform showing a tone signal for a prior art receiver device.
Figure 5:
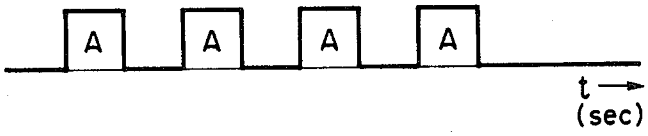
FIG. 5 shows a waveform applied to the tone signal decoder when the receiver device of FIG. 1 receives a tone signal of FIG. 4.
Figure 6:
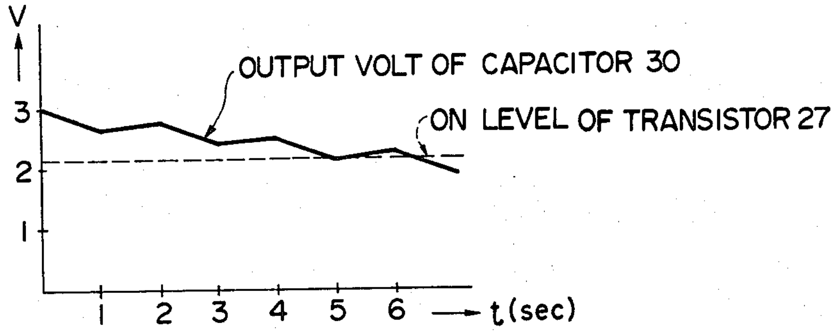
FIG. 6 (PRIOR ART)
FIG. 6 shows a waveform of a terminal voltage of a capacitor when the tone signal of FIG. 5 is applied to a conventional decoder.

In this manner, when the desired tone signal is applied to the decoder 16, the positive operation to generate alarm may be achieved. However, there occurs a possible erroneous operation with respect to a tone signal from the transmitting device wherein tone signals are transmitted repeatedly at suitable intervals though of short duration or feed time, within the same carrier. For example, as shown in FIG. 4, two tone signals A and B are fed alternately repeatedly at an interval of one second. When such a tone signal is received from the antenna 11 in FIG. 1, the tone signals are intermittently applied to the decoder 15 at an interval of one second. Thus, at every arrival of the tone signal A, the transistor 22 is turned on and at the same time the capacitor 30 is discharged. As described above, the discharge time of the capacitor 30 is about 3 seconds in the case the resistor 30 is interposed whereas the charge time thereof is about 10 seconds, which is longer than the former, if the resistance of resistor 23 is 100 KΩ. Therefore, the capacitor 30 partially discharged by arrival of the first tone signal A cannot be charged until the terminal voltage reaches its original terminal voltage value by the time of the arrival of the next tone signal A, and the terminal voltage decreases every arrival of the tone signal A. The transistor 27 is a PNP transistor and becomes actuated when the voltage applied to the base thereof is decreased by 0.7 V. Assume now that the working voltage of the transistor 27 is 2.3 V, the terminal voltage of the capacitor 30 reaches a potential, at which the transistor 27 is driven, by arrival of the third tone signal A to turn on the transistor 27. When the transistor 27 is turned on, the oscillator 17 is actuated as described above to produce an alarm sound from the speaker 17. However, this alarm sound results from malfunction.

Figure 7:
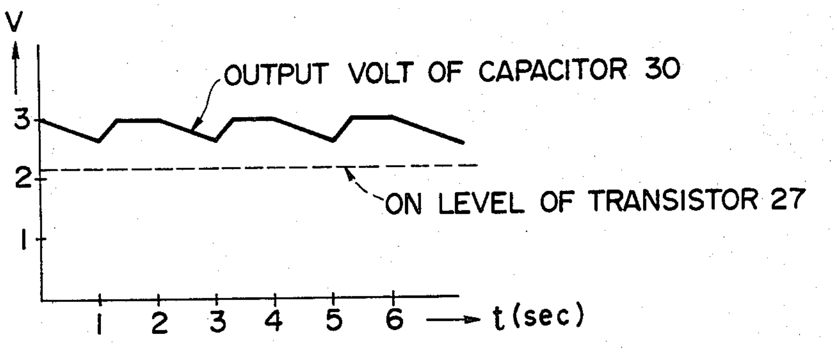
FIG. 7 shows a waveform of a terminal voltage of a capacitor when the tone signal of FIG. 5 is applied to the decoder of the present invention.

Such a malfunction can be prevented in a manner such that the capacitor 30 is rapidly charged forcibly by the transistor 38 and resistor 41 in the bypass circuit 35. That is, when the tone signal is applied to the input terminal 21, the transistor 22 is turned on and at the same time the transistor 37 is also turned on. If the transistor 37 is turned off, the transistor 38 is turned off so that at arrival of the tone signal, these transistors 37 and 38 do not at all affect in charge and discharge of the capacitor 30. When a state occurs in which the tone signal is not applied to the input terminal 21, the transistors 22 and 37 are turned off. On the other hand, the transistor 38 is turned on by the bias voltage of the resistor 40, and the power source voltage is applied to the capacitor 30 through the resistor 41 passing through the collector from the emitter of the transistor 38. If the resistor 41 is set, for example, to 15 KΩ or so, which is smaller than the resistance of the resistors 23 and 25, the transistor 38 is turned on to effect rapid charging. Accordingly, as shown in FIG. 7, the terminal voltage of the capacitor 30 is increased up to the prescribed voltage value of 3 V until the next tone signal arrives to prevent malfunction as described above. In this manner, malfunction will not occur even if the other jamming signal is intermittently applied from the same carrier. Also, even if the tone signal of short feed time is applied from the same carrier, the terminal voltage of the capacitor 30 is not decreased to the valve at which the transistor 27 is actuated, and the oscillator 17 is never actuated. That is, the threshold detection of the capacitor 30 and transistor 27 effectively functions without responding to a jamming signal.

While in the above described embodiment, the transistors 27, 37 and 38 are PNP transistors, it will be noted that these transistor may be NPN. In this case, the output of the output terminal 33 of the decoder may be obtained by the discharge of the capacitor 30.

What is claimed is:

1. A tone signal decoder responsive to a predetermined tone signal, comprising: a power source, an input terminal to which a tone signal is applied, means comprising a charge and discharge circuit having a capacitor and connected to said input terminal for controlling charging and discharging of said capacitor in response to said tone signal, means comprising a bypass circuit connected to said charge and discharge circuit for operating so that when said tone signal is not applied, said capacitor is placed in a respective one of the charge and discharge states corresponding to the absence of the tone signal within a time shorter than that required by said charge and discharge circuit, and a threshold circuit actuated when the capacitor terminal voltage reaches a threshold level because of said respective one of said charge and discharge states of said capacitor.

2. The tone signal decoder according to claim 1, wherein the respective one of the capacitor states corresponding to the absence of the tone signal is the charged state, and further comprising a switch for directly applying a power source voltage to said capacitor to bring said capacitor into the charged state within the time less than that required by said charge and discharge circuit thereby forcibly turning off said threshold circuit.

3. The tone signal decoder according to claim 1, wherein said bypass circuit is comprised of two series-connected inverting amplifiers and is connected between said power source and said capacitor.

4. The tone signal decoder according to claim 1, wherein said bypass circuit comprises a first transistor which is turned on when said tone signal is applied to said input terminal and a second transistor which is turned off when said first transistor is turned on, and a power source voltage is applied to said capacitor through said second transistor.

5. The tone signal decoder according to claim 1, wherein said threshold circuit comprises a first actuating transistor which is turned on when the terminal voltage of said capacitor reaches said threshold level and a second actuating transistor which is turned on by the turning-on operation of said first actuating transistor to hold said first actuating transistor.

* * * * *